United States Patent
Santosuosso et al.

(10) Patent No.: US 8,954,713 B2
(45) Date of Patent: *Feb. 10, 2015

(54) USING PREDICTIVE DETERMINISM WITHIN A STREAMING ENVIRONMENT

(71) Applicant: International Business Machines Corporation, Armonk, NY (US)

(72) Inventors: John M. Santosuosso, Rochester, MN (US); Brandon W. Schulz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/681,919

(22) Filed: Nov. 20, 2012

(65) Prior Publication Data

US 2013/0080653 A1    Mar. 28, 2013

Related U.S. Application Data

(63) Continuation of application No. 13/190,717, filed on Jul. 26, 2011.

(51) Int. Cl.
   *G06F 15/17* (2006.01)
   *H04L 29/06* (2006.01)
   *G06F 9/06* (2006.01)

(52) U.S. Cl.
   CPC .............. *H04L 65/608* (2013.01); *G06F 9/06* (2013.01); *G06F 15/17* (2013.01)
   USPC .......................................... 712/30; 709/231

(58) Field of Classification Search
   CPC .................................................. G06F 9/30516
   USPC ......................................................... 712/25
   See application file for complete search history.

(56) References Cited

U.S. PATENT DOCUMENTS 4,612,624 A * 9/1986 Tsuji .............................. 702/182
6,243,755 B1 * 6/2001 Takagi et al. .................. 709/229

(Continued)

FOREIGN PATENT DOCUMENTS

JP           10097437 A      4/1998
JP        2001325041 A     11/2001
WO       2010020577 A1      2/2010

OTHER PUBLICATIONS

Mikko H. Lipasti and John Paul Shen. 1996. Exceeding the dataflow limit via value prediction. In Proceedings of the 29th annual ACM/IEEE international symposium on Microarchitecture (MICRO 29). IEEE Computer Society, Washington, DC, USA, 226-237.*

(Continued)

*Primary Examiner* — Robert Fennema
*Assistant Examiner* — Keith Nielsen
(74) *Attorney, Agent, or Firm* — Patterson & Sheridan LLP

(57) ABSTRACT

Techniques are described for transmitting predicted output data on a processing element in a stream computing application instead of processing currently received input data. The stream computing application monitors the output of a processing element and determines whether its output is predictable, for example, if the previously transmitted output values are within a predefined range or if one or more input values correlate with the same one or more output values. The application may then generate a predicted output value to transmit from the processing element instead of transmitting a processed output value based on current input values. The predicted output value may be, for example, an average of the previously transmitted output values or a previously transmitted output value that was transmitted in response to a previously received input value that is similar to a currently received input value.

18 Claims, 7 Drawing Sheets

(56) References Cited

U.S. PATENT DOCUMENTS

| | | | |
|---|---|---|---|
| 6,516,409 B1* | 2/2003 | Sato | 712/239 |
| 7,206,861 B1 | 4/2007 | Callon | |
| 7,480,640 B1* | 1/2009 | Elad et al. | 706/14 |
| 7,529,752 B2 | 5/2009 | Hinshaw et al. | |
| 7,577,667 B2 | 8/2009 | Hinshaw et al. | |
| 7,644,863 B2 | 1/2010 | Chen et al. | |
| 7,834,875 B2 | 11/2010 | Liu et al. | |
| 7,860,009 B2 | 12/2010 | Pike et al. | |
| 7,944,863 B2* | 5/2011 | Smith et al. | 370/265 |
| 8,055,492 B2* | 11/2011 | Adir | 703/13 |
| 8,090,974 B1 | 1/2012 | Jain et al. | |
| 2002/0083063 A1 | 6/2002 | Egolf | |
| 2003/0229817 A1 | 12/2003 | Colasurdo et al. | |
| 2004/0052212 A1 | 3/2004 | Baillargeon | |
| 2006/0004935 A1 | 1/2006 | Seto et al. | |
| 2006/0026269 A1 | 2/2006 | Sadovsky et al. | |
| 2006/0036619 A1 | 2/2006 | Fuerst et al. | |
| 2006/0064438 A1 | 3/2006 | Aggarwal | |
| 2006/0206706 A1 | 9/2006 | Dietz | |
| 2006/0218123 A1 | 9/2006 | Chowdhuri et al. | |
| 2006/0224763 A1 | 10/2006 | Altunbasak et al. | |
| 2007/0073685 A1* | 3/2007 | Thibodeau et al. | 707/6 |
| 2007/0091089 A1 | 4/2007 | Jiao et al. | |
| 2007/0091827 A1 | 4/2007 | Boers et al. | |
| 2007/0129045 A1 | 6/2007 | Aerrabotu | |
| 2007/0147258 A1 | 6/2007 | Mottishaw et al. | |
| 2007/0288635 A1 | 12/2007 | Gu et al. | |
| 2007/0299980 A1 | 12/2007 | Amini et al. | |
| 2008/0000539 A1 | 1/2008 | Bivin | |
| 2008/0005392 A1 | 1/2008 | Amini et al. | |
| 2008/0028095 A1 | 1/2008 | Lang et al. | |
| 2008/0052041 A1* | 2/2008 | Misra et al. | 702/182 |
| 2008/0071939 A1 | 3/2008 | Tanaka et al. | |
| 2008/0168179 A1 | 7/2008 | Gu et al. | |
| 2008/0219281 A1 | 9/2008 | Akin et al. | |
| 2008/0238923 A1 | 10/2008 | Liu et al. | |
| 2009/0003600 A1 | 1/2009 | Chen et al. | |
| 2009/0034498 A1 | 2/2009 | Banerjea et al. | |
| 2009/0178043 A1 | 7/2009 | Prasanna et al. | |
| 2009/0216624 A1* | 8/2009 | Kato | 705/10 |
| 2009/0216694 A1 | 8/2009 | Lang et al. | |
| 2009/0254774 A1 | 10/2009 | Chamdani et al. | |
| 2009/0313400 A1 | 12/2009 | Amini et al. | |
| 2009/0313614 A1 | 12/2009 | Andrade et al. | |
| 2010/0030896 A1 | 2/2010 | Chandramouli et al. | |
| 2010/0106946 A1 | 4/2010 | Imaki et al. | |
| 2010/0199276 A1 | 8/2010 | Umbehocker | |
| 2010/0229178 A1 | 9/2010 | Ito | |
| 2010/0292980 A1* | 11/2010 | Andrade et al. | 703/22 |
| 2010/0293532 A1* | 11/2010 | Andrade et al. | 717/140 |
| 2011/0022812 A1 | 1/2011 | van der Linden et al. | |
| 2012/0123994 A1* | 5/2012 | Lowry et al. | 706/52 |
| 2012/0179809 A1 | 7/2012 | Barsness et al. | |
| 2013/0080652 A1 | 3/2013 | Cradick et al. | |
| 2013/0080653 A1 | 3/2013 | Santosuosso et al. | |
| 2013/0081042 A1 | 3/2013 | Branson et al. | |
| 2013/0290969 A1 | 10/2013 | Branson et al. | |

OTHER PUBLICATIONS da Costa et al., "The Dynamic Trace Memoization Reuse Technique", Oct. 15-19, 2000, "2000 International Conference on Parallel Architectures and Compilation Techniques", pp. 92-99.*

International Search Report and Written Opinion of the ISA dated May 14, 2013—International Application No. PCT/IB2013/050228.

U.S. Appl. No. 13/682,008 entitled "Dynamic Reduction of Stream Backpressure", filed Nov. 20, 2012.

U.S. Appl. No. 13/681,820 entitled "Dynamic Runtime Choosing of Processing Communication Methods", filed Nov. 20, 2012.

U.S. Appl. No. 13/681,769 entitled "Management System for Processing Streaming Data", filed Nov. 20, 2012.

U.S. Appl. No. 13/361,287 entitled "Processing Element Management in a Streaming Data System", filed Jan. 30, 2012.

U.S. Appl. No. 13/709,405 entitled "Processing Element Management in a Streaming Data System", filed Dec. 10, 2012.

U.S. Appl. No. 13/456,600 entitled "Operator Graph Changes in Response to Dynamic Connections in Stream Computing Applications", filed Apr. 26, 2012.

U.S. Appl. No. 13/675,872 entitled "Streams Optional Execution Paths Depending Upon Data Rates", filed Nov. 13, 2012.

U.S. Appl. No. 13/706,115 entitled "Streams Optional Execution Paths Depending Upon Data Rates", filed Dec. 5, 2012.

International Search Report and Written Opinion of the ISA dated Dec. 20, 2012—International Application No. PCT/IB2012/053790.

U.S. Appl. No. 13/190,694, entitled "Dynamic Reduction of Stream Backpressure", filed Jul. 26, 2011.

U.S. Appl. No. 13/190,757, entitled "Dynamic Runtime Choosing of Processing Communication Methods", filed Jul. 26, 2011.

U.S. Appl. No. 13/190,810, entitled "Management System for Processing Streaming Data", filed Jul. 26, 2011.

U.S. Appl. No. 13/190,717, entitled "Using Predictive Determinisn Within a Streaming Environment", filed Jul. 26, 2011.

U.S. Appl. No. 13/780,800 entitled, "Operator Graph Changes in Response to Dynamic Connections in Stream Computing Applications", filed Feb. 28, 2013.

* cited by examiner

| | INPUT 1 | INPUT 2 | OUTPUT 1 | OUTPUT 2 |
|---|---|---|---|---|
| PREVIOUS CYCLE 1 | 2 | 100 | 51 | 200 |
| PREVIOUS CYCLE 2 | 15 | 18 | 16.5 | 270 |
| PREVIOUS CYCLE 3 | 80 | 3 | 41.5 | 240 |
| CURRENT CYCLE | 14 | 19 | ? | ? |

| | INPUT 1 | INPUT 2 | PRE-DETERMINED OUTPUT 1 | PRE-DETERMINED OUTPUT 2 | PROCESSED OUTPUT 1 | PROCESSED OUTPUT 2 |
|---|---|---|---|---|---|---|
| CURRENT CYCLE | 14 | 19 | 16.5 | 270 | 16.5 | 266 |

|  | INPUT 1 | INPUT 2 | OUTPUT 1 |
|---|---|---|---|
| PREVIOUS CYCLE 1 | 220 | 34 | 36.2 |
| PREVIOUS CYCLE 2 | 100 | 80 | 81 |
| PREVIOUS CYCLE 3 | 5 | 6 | 6.05 |
| CURRENT CYCLE | 23 | 13 | ? |

|  | INPUT 1 | INPUT 2 | PREDETERMINED OUTPUT 1 | PROCESSED OUTPUT 1 |
|---|---|---|---|---|
| CURRENT CYCLE | 23 | 13 | 13 | 13.23 |

|  | PREDETERMINED INPUT 1 | INPUT 1 | OUTPUT 1 |
|---|---|---|---|
| CURRENT CYCLE | 108.3 | 13 | 14.08 |

|  | INPUT 1 | INPUT 2 | OUTPUT 1 |
|---|---|---|---|
| PREVIOUS CYCLE 1 | 100 | 2 | 10,102 |
| PREVIOUS CYCLE 2 | 15 | 20 | 10,035 |
| PREVIOUS CYCLE 3 | 300 | 160 | 10,460 |
| CURRENT CYCLE | 4 | 36 | ? |

|  | INPUT 1 | INPUT 2 | PREDETERMINED OUTPUT 1 | ACTUAL OUTPUT 1 |
|---|---|---|---|---|
| CURRENT CYCLE | 4 | 36 | 10,199 | 10,040 |

USING PREDICTIVE DETERMINISM WITHIN A STREAMING ENVIRONMENT

CROSS-REFERENCE TO RELATED APPLICATIONS

This application is a continuation of co-pending U.S. patent application Ser. No. 13/190,717, filed Jul. 26, 2011. The aforementioned related patent application is herein incorporated by reference in its entirety.

BACKGROUND

1. Field of the Invention

Embodiments of the present invention generally relate to stream computing applications. Specifically, the invention relates to using predictive determinism to avoid processing current inputs received by a processing element in a stream computing application.

2. Description of the Related Art

While computer databases have become extremely sophisticated, the computing demands placed on database systems have also increased at a rapid pace. Database systems are typically configured to separate the process of storing data from accessing, manipulating or using data stored in the database. More specifically, databases use a model where data is first stored, then indexed, and finally queried. However, this model cannot meet the performance requirements of some real-time applications. For example, the rate at which a database system can receive and store incoming data limits how much data can be processed or otherwise evaluated. This, in turn, can limit the ability of database applications to process large amounts of data in real-time.

SUMMARY

Embodiments of the invention provides a method product for processing data which include receiving streaming data to be processed by a plurality of processing elements and establishing an operator graph of the plurality of processing elements. The operator graph defines at least one execution path where at least one of the processing elements of the operator graph is configured to receive data from at least one upstream processing element and transmit data to at least one downstream processing element. The method product determines whether an output of a first processing element of the plurality of processing elements is predictable based on at least one previously transmitted output value. The method, system, and computer program product receive a current input value at a second processing element of the plurality of processing elements and if the output of the first processing element is predictable and in response to receiving the current input value, the method, system, and computer program product transmit a predicted output value from the second processing element, wherein the predicted output value is based on previously computed output values generated by the second processing element.

Embodiments of the invention provide a method which includes receiving streaming data to be processed by a plurality of processing elements and establishing an operator graph of the plurality of processing elements. The operator graph defines at least one execution path where at least one of the processing elements of the operator graph is configured to receive data from at least one upstream processing element and transmit data to at least one downstream processing element. The method determines whether an output of a first processing element of the plurality of processing elements is predictable based on at least one previously transmitted output value being substantially similar to at least one corresponding previously received input value. The method also receives a current input value at a second processing element of the plurality of processing elements and determines if the current input value is within a range based on the at least one corresponding previously received input value. If the output is predictable and if the current input value is within the determined range, the method transmits the current input value as the output from the second processing element.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
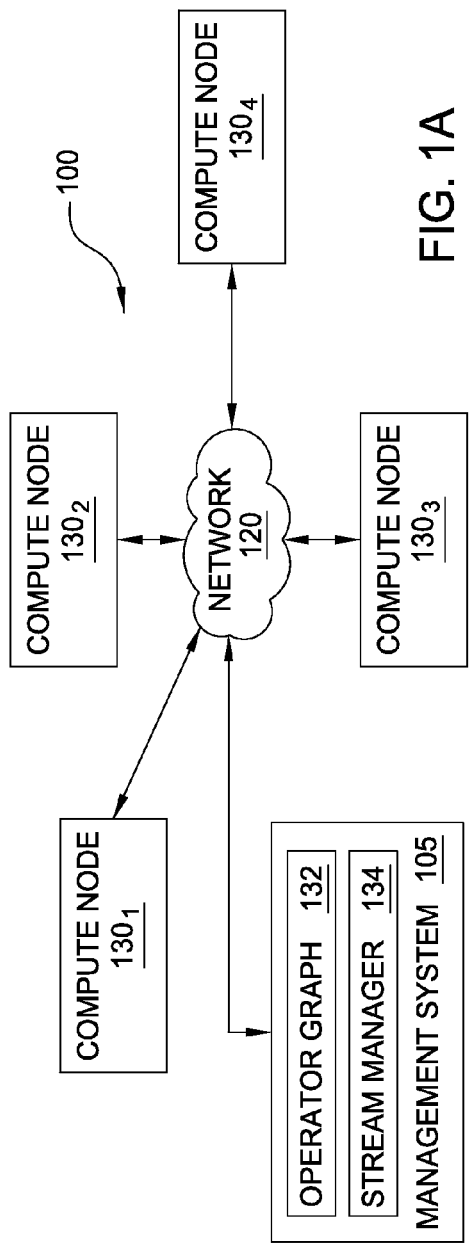
FIGS. 1A-1B illustrate a computing infrastructure configured to execute a stream computing application, according to one embodiment of the invention.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in milliseconds. Constructing an application using this type of processing has opened up a new programming paradigm that will allow for a broad variety of innovative applications, systems and processes to be developed, as well as present new challenges for application programmers and database developers.

In a stream computing application, operators are connected to one another such that data flows from one processing element to the next (e.g., over a Transmission Control Protocol/Internet Protocol, or TCP/IP, socket). Scalability is reached by distributing an application across nodes by creating many small executable pieces of code (i.e., operators), as well as replicating processing elements on multiple nodes and load balancing among them. Processing elements (and operators) in a stream computing application can be fused together to form a larger processing element or a job. Doing so allows processing elements to share a common process space, resulting in much faster communication between operators than is available using inter-process communication techniques (e.g., using a TCP/IP socket). Further, processing elements can be inserted or removed dynamically from an operator graph representing the flow of data through the stream computing application, as well as fused or un-fused from a stream computing application during runtime.

One advantage of stream computing applications is that they allow the user to granularly control the process flow of data through the application. In other words, the user may designate specific operators for each processing element that perform various operations on the incoming data, and may dynamically alter the stream computing application by modifying the operators and the order in which they are performed. Additionally, stream computing applications are able to handle large volumes of data.

However, because stream computing applications often deal with large volumes of data, the processing of which is spread over multiple processing elements across multiple compute nodes, a processing element may need to produce an output faster than it is able. Instead of requiring a processing element to generate output data by processing currently received input data, a processing element may instead output predetermined data. This predetermined data (or predicted output data) may be based on, for example, an average of the output data that was previously processed and transmitted by the processing element. Moreover, the processing element may only transmit predicted output data if the previously processed output data falls within an acceptable range. That is, if the previous output data is deterministic. A processing element, or data flowing out of the processing element, is "deterministic" if the values of the output data can be predicted with some minimum amount of confidence. For example, output data may be predictable or deterministic because a certain input always yields a certain output or because the output data typically has a value within a certain range—e.g., the output values for a processing element are within a predefined range 80% of the time. Once the output data is deemed deterministic, using the predicted output data may allow the processing element to transmit output data faster, or with less processing, than it otherwise would be able.

Moreover, the processing element may output predetermined data only if there is a need to limit or stop processing received input data. For example, the stream computing application may be experiencing backpressure. "Backpressure" is a term used to describe one or more processing elements that are unable to transmit or receive additional data because either their buffer or a buffer associated with a downstream processing element is full. In the case of some real-time applications, the processing element may trade accuracy for increased data throughput where the time required for data to propagate through the stream computing application is an important factor.

Embodiments of the invention provide techniques for identifying a processing element that may transmit predicted output data instead of processing current input data. This predicted output data may be based on previously transmitted outputs from the processing element. Transmitting predicted output data may alleviate backpressure, reduce data propagation time, reduce costs of operating the stream computing application, reduce demand on shared hardware resources, or increase the tuple throughput rate in the stream computing application.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present invention, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Figure 1B:
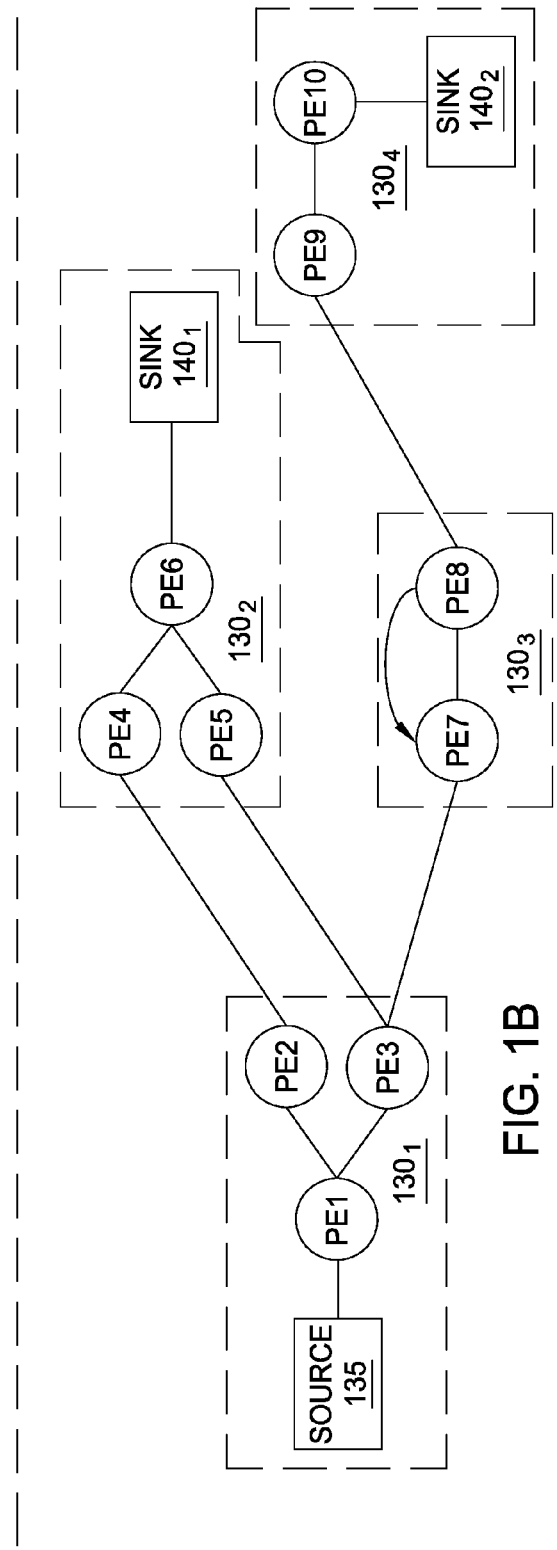

FIGS. 1A-1B illustrate a computing infrastructure configured to execute a stream computing application, according to one embodiment of the invention. As shown, the computing infrastructure 100 includes a management system 105 and a plurality of compute nodes $130_{1-4}$, each connected to a communications network 120. Also, the management system 105 includes an operator graph 132 and a stream manager 134. As described in greater detail below, the operator graph 132 represents a stream computing application beginning from one or more source processing elements (PEs) through to one or more sink PEs. This flow from source to sink is also generally referred to herein as an execution path. However, an operator graph may be a plurality of linked together executable units (i.e., processing elements) with or without a specified source or sink. Thus, an execution path would be the particular linked together execution units that data traverses as it propagates through the operator graph.

Generally, data attributes flow into a source PE of a stream computing application and are processed by that PE. Typically, processing elements receive an N-tuple of data attributes from the stream as well as emit an N-tuple of data attributes into the stream (except for a sink PE where the stream terminates). Of course, the N-tuple received by a processing element need not be the same N-tuple sent downstream. Additionally, the processing elements could be configured to receive or emit data in formats other than a tuple (e.g., the processing elements could exchange data marked up as Extensible Markup Language, or XML, documents). Furthermore, each processing element may be configured to carry out any form of data processing functions on the received tuple, including, for example, writing to database tables or performing other database operations such as data joins, splits, reads, etc., as well as performing other data analytic functions or operations.

The stream manager 134 may be configured to monitor a stream computing application running on the compute nodes $130_{1-4}$, as well as to change the structure of the operator graph 132. The stream manager 134 may move processing elements (PEs) from one compute node 130 to another, for example, to manage the processing loads of the compute nodes 130 in the computing infrastructure 100. Further, stream manager 134 may control the stream computing application by inserting, removing, fusing, un-fusing, or otherwise modifying the processing elements (or what data-tuples flow to the processing elements) running on the compute nodes $130_{1-4}$. One example of a stream computing application is IBM®'s InfoSphere® (note that InfoSphere® is a trademark of International Business Machines Corporation, registered in many jurisdictions worldwide).

FIG. 1B illustrates an example operator graph that includes ten processing elements (labeled as PE1-PE10) running on the compute nodes $130_{1-4}$. While a processing element may be executed as an independently running process with its own process ID (PID) and memory space, multiple processing elements may also be fused to run as single process or job (with a PID and memory space). In cases where two (or more) processing elements are running independently, inter-process communication may occur using a "transport" (e.g., a network socket, a TCP/IP socket, or shared memory). However, when processes are fused together, the fused processing elements can use more rapid communication techniques for passing tuples (or other data) among processing elements (and operators in each processing element).

As shown, the operator graph begins at a source 135 (that flows into the processing element labeled PE1) and ends at sink $140_{1-2}$ (that flows from the processing elements labeled as PE6 and PE10). Compute node $130_1$ includes the processing elements PE1, PE2 and PE3. Source 135 flows into the processing element PE1, which in turn emits tuples that are received by PE2 and PE3. For example, PE1 may split data attributes received in a tuple and pass some data attributes to PE2, while passing other data attributes to PE3. Data that flows to PE2 is processed by the operators contained in PE2, and the resulting tuples are then emitted to PE4 on compute node $130_2$. Likewise, the data tuples emitted by PE4 flow to sink PE6 $140_1$. Similarly, data tuples flowing from PE3 to PE5 also reach sink PE6 $140_1$. Thus, in addition to being a sink for this example operator graph, PE6 could be configured to perform a join operation, combining tuples received from PE4 and PE5. This example operator graph also shows data tuples flowing from PE3 to PE7 on compute node $130_3$, which itself shows data tuples flowing to PE8 and looping back to PE7. Data tuples emitted from PE8 flow to PE9 on compute node $130_4$, which in turn emits tuples to be processed by sink PE10 $140_2$.

Furthermore, although embodiments of the present invention are described within the context of a stream computing application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, embodiments of the invention may be configured to operate in a clustered environment with a standard database processing application.

Figure 2:
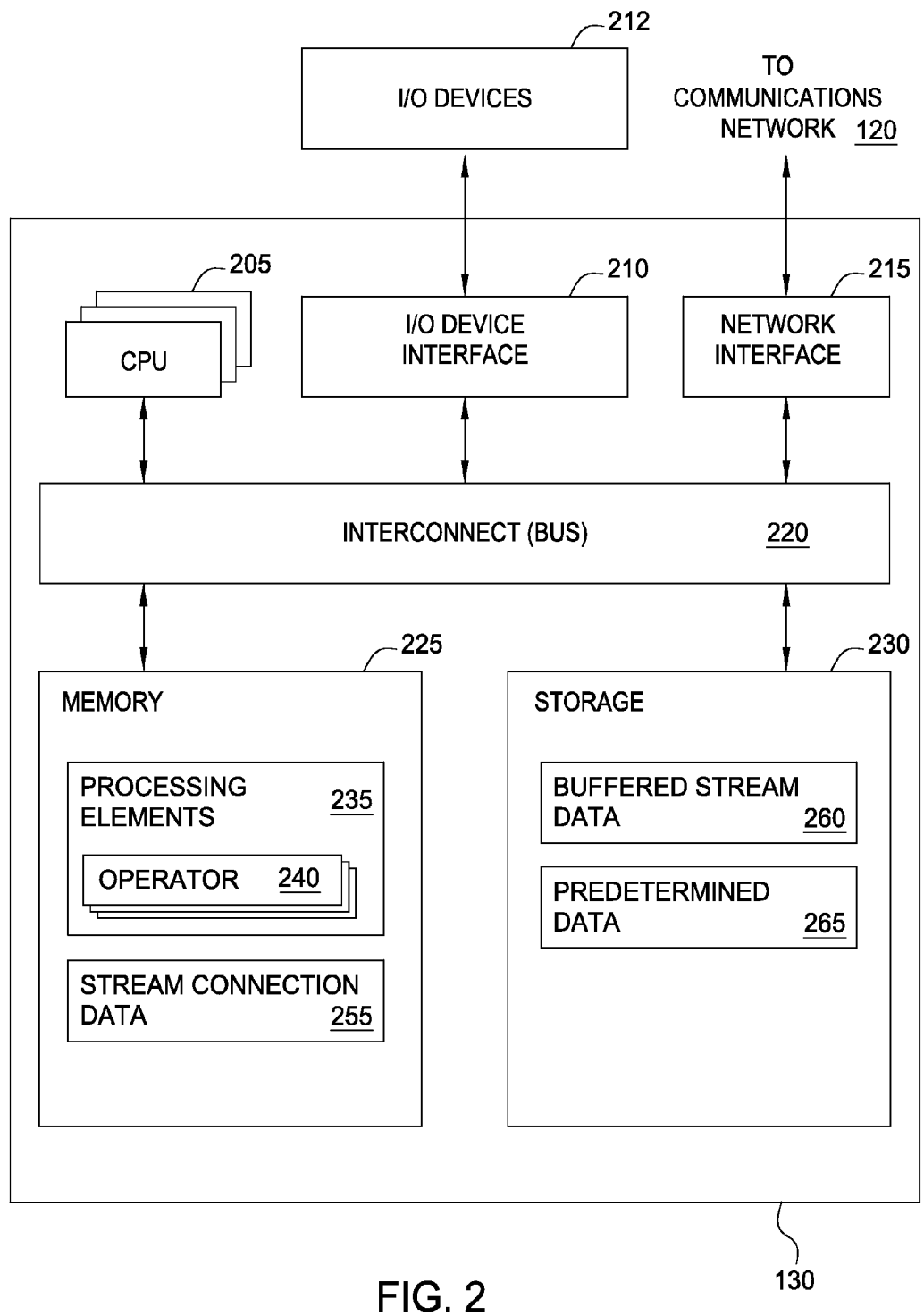
FIG. 2 is a more detailed view of the compute node of FIGS. 1A-1B, according to one embodiment of the invention.

FIG. 2 is a more detailed view of the compute node 130 of FIGS. 1A-1B, according to one embodiment of the invention. As shown, the compute node 130 includes, without limitation, at least one CPU 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, network interface 215, and memory 225. CPU 205 is included to be representative of a single CPU, multiple CPUs, a single CPU having multiple processing cores, and the like. The memory 225 is generally included to be representative of a random access memory (e.g., DRAM or Flash). Storage 230, such as a hard disk drive, solid state device (SSD), or flash memory storage drive, may store non-volatile data.

In this example, the memory 225 includes a plurality of processing elements 235 and stream connection data 255. Each PE 235 includes a collection of operators 240. As noted above, each operator 240 may provide a small chunk of executable code configured to process data flowing into a processing element (e.g., PE 235) and to emit data to other operators 240 in that PE and to other processing elements in the stream computing application. Such processing elements may be on the same compute node 130 or on other compute nodes accessible over the data communications network 120. The stream connection data 255 represents the connections between PEs on compute node 130 (e.g., a TCP/IP socket connection between two separate PEs 235), as well as connections to other compute nodes 130 with upstream and or downstream PEs in the stream computing application, also via TCP/IP sockets (or other inter-process data communication mechanisms).

As shown, storage 230 contains buffered stream data 260 and predetermined data 265. The buffered stream data 260 represents a storage space for data flowing into the compute node 105 from upstream processing elements (or from a data source for the stream computing application). For example, buffered stream data 260 may include data tuples waiting to be processed by one of the PEs 235—i.e., a buffer. Buffered stream data 260 may also store the results of data processing performed by processing elements 235 that will be sent to downstream processing elements. For example, a PE 235 may have to store tuples intended for a downstream PE 235 if that PE 235 already has a full buffer, which may occur when the operator graph is experiencing backpressure. On the other hand, the predetermined data 265 may be formulated after running a particular stream computing application several times. Generally, PE 235 may transmit as an output the values stored in the predetermined data 265 instead of processing current input values. Predetermined data 265 can be, for example, the average of a plurality of previously computed output values or the output value that corresponds to a particular input value received by the PE 235.

Figure 3:
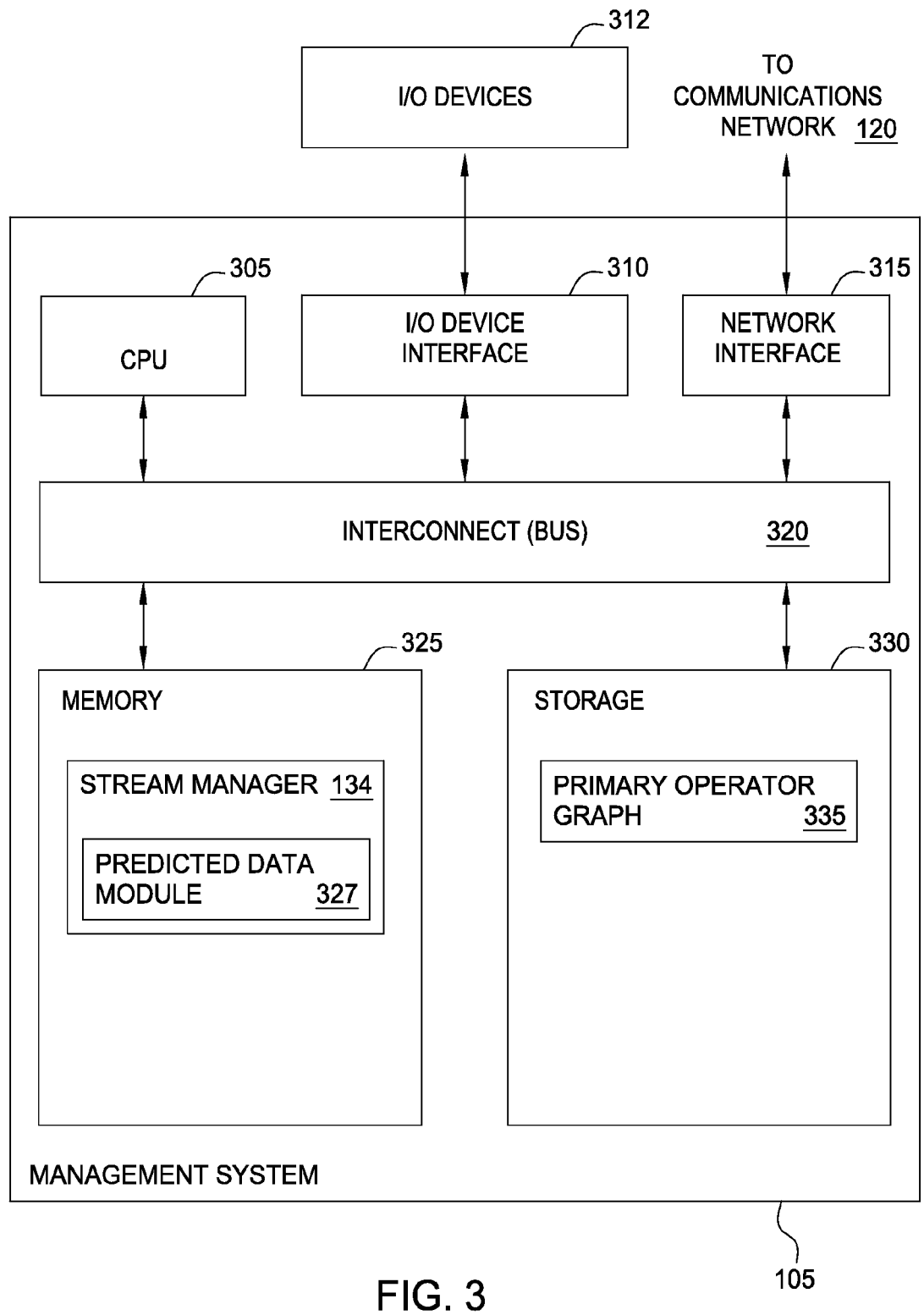
FIG. 3 is a more detailed view of the server computing system of FIG. 1, according to one embodiment of the invention.

FIG. 3 is a more detailed view of the server computing system 105 of FIG. 1, according to one embodiment of the invention. As shown, server computing system 105 includes, without limitation, a CPU 305, a network interface 315, an interconnect 320, a memory 325, and storage 330. The client system 130 may also include an I/O device interface 310 connecting I/O devices 312 (e.g., keyboard, display and mouse devices) to the server computing system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 134. Additionally, the storage 330 includes a primary operator graph 132. The stream manager 134 may use the primary operator graph 132 to route tuples to PEs 235 for processing.

The stream manager 134 may include a predicted data module 327 which includes logic for generating predicted output data for a processing element 235. The predicted data module 327 may use previously transmitted output data as well as current or previously received input data from a PE 235 to determine predicted output data which may then be stored in the predetermined data 265 associated with the PE 235. For example, the predicted data module 327 may compute the average for a plurality of previously transmitted output values or determine the mode—i.e., most frequently used—of the output values. Moreover, the predicted data module 327 may continually generate predicted output data for each processing element 235 in an operator graph, or generate predicted output data only after the stream manager 134 has determined that the processing element 235 is deterministic. The PE 235 is then able to transmit the predicted output data stored in the predetermined data 265 rather than processing currently received data.

Figure 4:
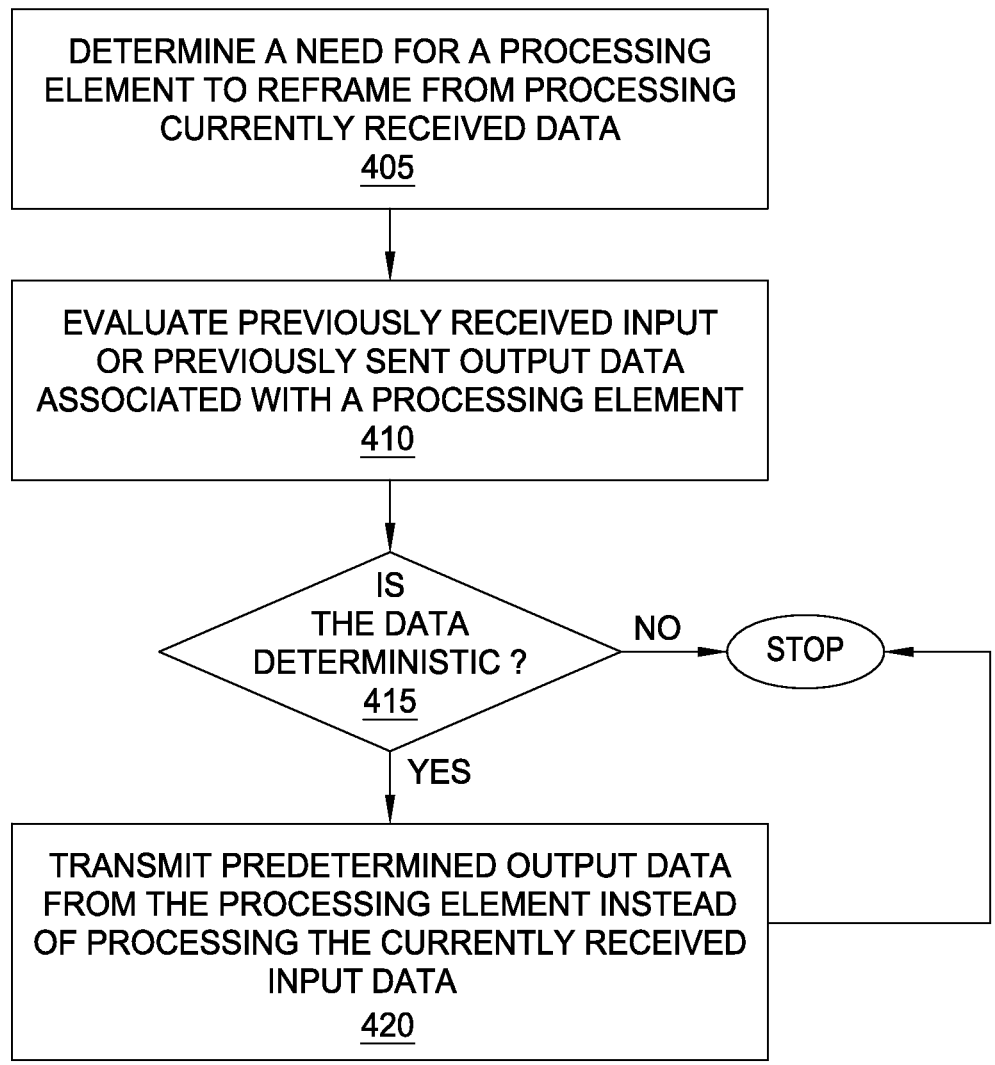
FIG. 4 is a flow diagram illustrating a method of using predicted output data, according to embodiments of the invention.

FIG. 4 is a flow diagram illustrating a method of using predicted output data, according to embodiments of the invention. At step 405, the stream manager 134 determines a need for a processing element to limit or stop processing currently received input data. This need may be based on whether the operator graph is experiencing backpressure, whether the data processed by the stream computing application is time sensitive, reducing costs of operating the stream computing application (e.g., power consumption or replacing worn out hardware components), reducing demand on shared hardware resources, increasing the tuple rate, and the like.

Backpressure may be exhibited by decreasing tuple throughput rates for one or more processing elements, or by the buffered stream data 260 beginning to exceed the capacity of a buffer associated with a processing element. The stream manager 134 may monitor these indicators to determine if there is a need for a processing element to stop processing currently received input data. For example, a processing element that is unable to process tuples as fast as they are received, which may cause the unprocessed tuples to fill up the buffer, may cease processing the tuples (or only process a fraction of the tuples) and instead transmit predicted output data stored in the predetermined data 265. The unprocessed tuples may then be discarded. Assuming that the processing element can transmit predicted output data faster than it can process data received from upstream processing elements, the backpressure may be alleviated.

In a real-time application, which may use a stream computing application, accuracy may be sacrificed for increased data throughput (i.e., decreased propagation time). In a stream computing application that may take hours for data to propagate through the operator graph, it may be important for some results to be outputted regardless if those results are not 100% accurate. For example, in a complex weather monitoring application, determining a path where a storm cell may be heading with some degree of uncertainty may be preferred over waiting until the path of the storm is detected with greater accuracy (i.e., every processing element processes received input data rather than transmitting predicted output data).

Selective processing of input data may also reduce costs of operating the stream computing application. As shown in FIG. 2, each PE 235 may be run on a compute node 130 with a CPU 205, memory 225, storage 230 and the like. Each of these hardware components require power to run. However, transmitting predicted output data in lieu of processing received input data may require less computing time and thus less power. In a distributive system with thousands of compute nodes 130, the power savings may be significant. Moreover, reducing the workload of the hardware components may increase their lifespan and mitigate replacement costs.

The hardware components shown in FIG. 2 may be shared by other processes running in the memory 225 of the compute node 130. For example, if multiple applications are running on the node 130, one application may have a higher priority than the streaming application. Accordingly, reducing the processing done by the processing element 235 by transmitting predicted output data may free additional computer resource to be used by the higher priority application.

A need to stop or limit a processing element from processing currently received input data may also be determined by monitoring the tuple rate of a processing element. A processing element may need to send out two tuples for every one tuple it receives, or transmit one tuple for every three tuples received. Nonetheless, the stream manager 134 may monitor each processing element in an operator graph to ensure the processing elements are maintaining the necessary tuple rate. If not, the stream manager 134 may determine that slow processing element may benefit from using predicted output data instead of processing all or a fraction of the received input data.

In one embodiment, the stream manager 134 may monitor a combination of the different indicators of need. Furthermore, the method 400 is not limited to only the indicators of need discussed above; instead, any indicator that performs the functionality described herein may be used.

In one embodiment, the method 400 may omit step 405 and always use predicted output data if the previous output or input data is deterministic. That is, the stream manager 134 does not determine a need for transmitting predicted output data before instructing a processing element to do so. In this manner, the operating costs of the hardware components, for example, may be reduced regardless of need.

At step 410, the stream manager 134 evaluates previously received input or previously sent output data associated with each processing element. The stream manager 134 may evaluate whether certain inputs to a processing element correspond to certain outputs, whether one or more inputs has little affect on one or more outputs, or whether an output of the processing element is predictable regardless of the current inputs. Each of these examples are discussed in further detail in FIGS. 5A-C, 6A-D, and 7A-C, respectively. Generally, the stream manger 134 evaluates the outputs of the processing elements to ascertain whether the processing elements are deterministic. Determining that the data flowing out of the processing element is deterministic ensures that the generated predicted output data for a processing element may be relied upon, with varying degrees of confidence, to represent what would have actually been sent if the processing element had processed the current inputs. The more deterministic a processing element, the more accurate the predicted output data may be. For example, the stream manager 134 may determine that the output for a processing element is within a defined range 80% of the time. Accordingly, the predicted data module 327 may store the median value of the range (i.e., the predicted output data) in the corresponding processing element's predetermined data 265. However, if the output is within the range 90% of the time, the corresponding median value provides a higher level of confidence that it represents data that would have been transmitted based on the current inputs.

Instead of ascertaining whether an output is within a predefined range, the stream manager 134 may evaluate the standard deviation of the data flowing out of processing element. For example, the stream manager 134 may plot each previously transmitted output value and extrapolate a standard deviation for the plot to determine the variation (or dispersion) of the output values. A higher standard deviation corresponds to a less deterministic output, while a lower standard deviation corresponds to a higher deterministic output. Moreover, the stream manager 134 may use both a predefined range and the standard deviation of an input or output to ascertain whether a processing element is deterministic.

Although this process may add some uncertainty into the transmitted output data, it may increase the tuple throughput in a processing element.

At step 415, the stream manager 134 determines if the output data is deterministic for a particular processing element. FIGS. 5A-C, 6A-C, and 7A-C each illustrate deterministic processing elements.

Figures 5A, 5B, 5C:
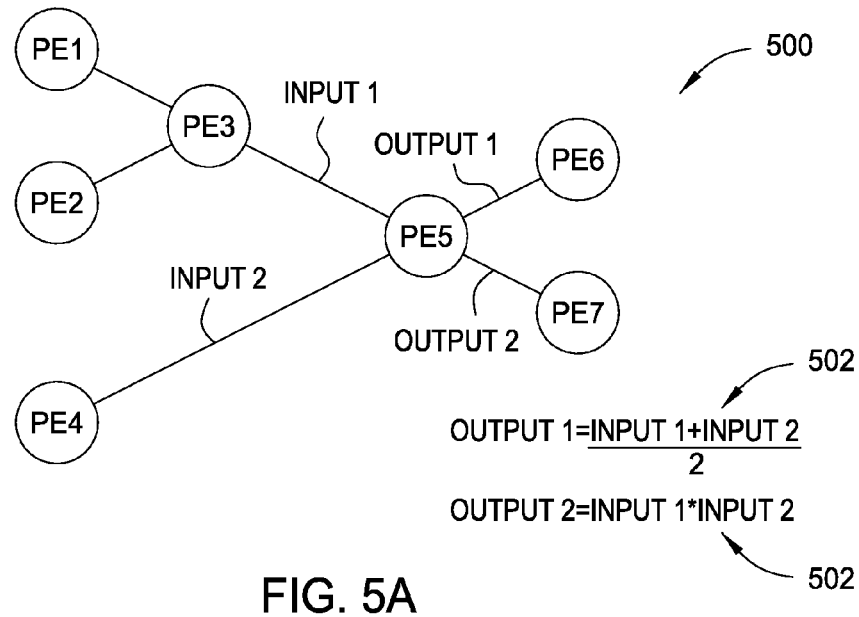
FIGS. 5A-5C illustrate deterministic processing elements that may use predicted output data, according to one embodiment of the invention.

FIGS. 5A-5C illustrate deterministic processing elements that may use predicted output data, according to one embodiment of the invention. Specifically, the operator graph 500 illustrates a processing element—PE5—that is deterministic because certain inputs correspond to certain outputs. That is, the output values are deterministic because they may be predicted based on the received input data. As shown, Output 1 is determined by averaging both Input 1 and Input 2 while Output 2 is found by multiplying the inputs. Thus, if PE5 again receives the same values for Input 1 and Input 2, it will again yield the same corresponding outputs. The stream manager 134 may determine PE5 is deterministic by noting that when the same inputs are received several times, the same output values are transmitted.

In one embodiment, however, the outputs for the same inputs may slightly change. Nonetheless, PE5 may still be deterministic as long as the output is within a predefined range or the standard deviation is sufficiently small. For example, assume PE5 takes the average of both Inputs 1 and 2 and adds a relatively small integer that changes based on the time of day. Depending on the time of day, the same inputs would not yield the exact same outputs. However, because the difference may be slight, the output data is still sufficiently predictable based on the current inputs. Accordingly, predicted output data may still be used.

In one embodiment, the stream manager 134 may monitor and save the inputs and corresponding outputs for PE5 in the predetermined data 265 which may be organized as a lookup table. If the stream manager 134 instructs PE5 to send predicted output data, PE5 may evaluate the currently received input data and determine if it matches predicted output data stored in the predetermined data 265. Alternatively, if the same inputs produce slightly different outputs which are still deterministic, the predicted output data may be the average or the mode of the previously transmitted outputs. Using the predicted output data stored in the predetermined data 265 permits the PE5 to avoid performing the algorithms 502 associated with each output. However, for some stream computing applications this technique may require too much memory to or create a look-up table so large that it would take less computing power to simply process the input data than look up the predicted output data in the table.

In another embodiment, the stream manager 134 may instruct PE5 to use the predicted output data even if one (or both) of the inputs do not match the previously received input data. FIG. 5B illustrate a table of three previously received input data and corresponding transmitted output data as well as currently received input data. The stream manager 134 may determine that the currently received input data—14 and 19—are sufficiently close to the inputs received in Previous Cycle 2 to use the corresponding outputs. That is, the stream manager 134 may establish a predefined range for each of the previously received inputs such that if any currently received inputs fall within that range, the processing element transmits the output data associated with the previously received inputs. Moreover, using a range of input values permits the stream manager 134 to selective store previous inputs and previous outputs into the look-up table. The stream manager 134 may, for example, only store frequently used inputs or inputs that are representative of a range rather than storing every input combination that is processed by PE5. This technique may save memory and still maintain a look-up table consisting of predicted output data.

FIG. 5C illustrates transmitting predicted output data. Predefined rules in the stream manager 134 may establish that when PE5 receives inputs that fall within a range of a previously received input (e.g., +/−1 of the inputs in Previous Cycle 2), PE5 may skip processing the current input data and instead transmit the previously transmitted output data. In table 510, the output values for Previous Cycle 2 are used for the output values of the Current Cycle. Comparing the predetermined outputs with the outputs if the processing element would have processed the current inputs (i.e., Processed Outputs 1 and 2) illustrates the inaccuracies that may be introduced into the data.

The rules in the stream manager 134 may be further refined to limit inaccuracies. In one embodiment, the acceptable ranges for the inputs may be narrowed if the inputs for a previous cycle are, for example, not similar. If the currently received inputs are 3 and 100, then using the outputs of Previous Cycle 1 as the predicted output data would yield Predetermined Output 2 of 200 when the Processed Output 2 would be 300—a miscalculation of 50%. In another embodiment, the acceptable ranges for each input may be different. Using the same example, the stream manager 134 may use the outputs from Previous Cycle 1 as the predicted output data if current value of Input 2 is within +/−5 of 100 but only if the current value Input 1 equals 2. This pre-processing of the input values may be performed by the processing element or by the stream manager 134.

By providing a range that the inputs must fall into before predicted output data is used, the stream manager 134 is characterizing a processing element as deterministic in certain situations but not in others. That is, if current inputs are similar to previously received inputs, PE5 may be deterministic (i.e., the outputs may predicted with sufficient certainty), but if not, the output of PE5 may be too unpredictable to use predicted output data.

FIGS. 6A-6D illustrate deterministic processing elements that may use predicted output data, according to one embodiment of the invention. Specifically, operator graph 600 illustrates a processing element—PE5—that is deterministic based on only one input. More generally, one or more outputs of PE5 are determined based solely on a subset of the inputs. This permits the PE5 to ignore the one or more inputs that do not significantly contribute to the one or more outputs. The range that determines whether an input "significantly" alters an output may be adjusted by changing the rules in the stream manager 134. For example, the stream manager 134 may determine that an output is predicted by an input only if the output is within a predefined value of the input 90% of the time.

Figures 6A, 6B, 6C, 6D:
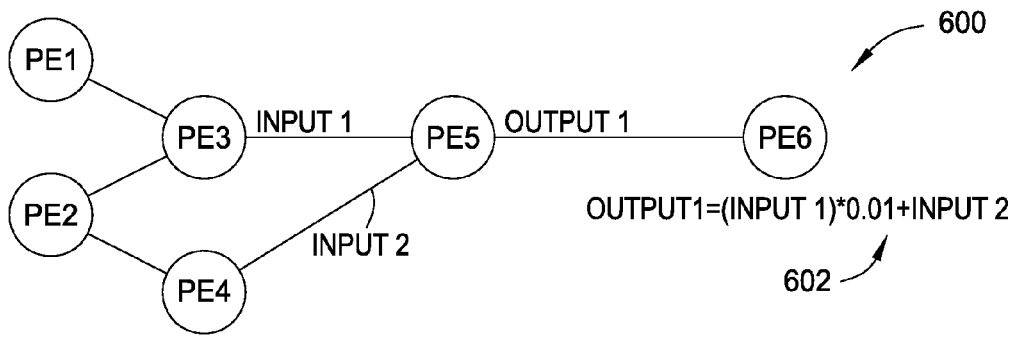
FIGS. 6A-6D illustrate deterministic processing elements that may use predicted output data, according to one embodiment of the invention.

Table 605 in FIG. 6B illustrates an algorithm 602 where the value of Output 2 is primarily determined by the value of Input 2. Output 1 is found by adding Input 2 with Input 1 after reducing Input 1 by 99% of its value. As shown in Table 610 of FIG. 6C, the predicted output data transmitted by PE5 (i.e., Predetermined Output 1) is the value of Input 2. In other words, the stream manager 134 may load in the predetermined data 265 associated with PE5 an instruction to transmit to PE6 the value of Input 2. In one embodiment, the stream manager 134 may further reduce any inaccuracies by measuring the difference between Input 2 and Output 1 from previous cycles and instructing PE5 to add that average (i.e., 1.08) to Input 2 before sending the value to PE6. In this manner, the stream manager 134 may reduce the processing that would normally be done by PE5 (i.e., PE5 can skip processing one of the inputs) rather than eliminating all the processing entirely. However, the accuracy of the predicted output data may be increased.

Tables 615 in FIG. 6D illustrates skipping processing of received input data at an upstream element based on a deterministic downstream processing element. As shown by table 605, the value of Input 1 has a negligible effect on Output 1. The stream manager 134 may evaluate the values of Input 1 to determine its effect on Output 1 and, after several cycles, may determine that Input 1 consistently has a negligible effect on Output 1. For example, although the values of Input 1 fluctuate from 5 to 220, the output values closely follows Input 2—e.g., Output 1 is within a predefined range of Input 2. Accordingly, instead of not processing input data at PE5, the stream manager 134 may instruct PE3 (an upstream processing element) to stop processing received input data. As shown by table 615, an average of the previous outputs of PE3 (i.e., Input 1) may be loaded into the predetermined data 265 associated with PE3 and used as Input 1 for PE5. PE5 would then receive Predetermined Input 1 from PE3 and perform the necessary processing. In this manner, a downstream processing element that is deterministic may allow the stream manager 134 to instruct an upstream processing element to stop processing input data.

In one embodiment, although not shown, both the deterministic downstream processing element and the upstream processing element may both use predicted output data instead of processing currently received input data. For example, using the values shown in Table 615, PE5 may re-transmit Input 2 instead of performing the algorithm 602 illustrated in FIG. 6A. Because PE5 does not need Input 1 to transmit predicted output data, PE3 may also transmit predicted output data instead of processing current input data.

In one embodiment, a plurality of upstream processing elements may send predicted output data rather than processing currently received input data. As shown in FIG. 6A, PE3 receives data from PE1. Because PE1 does not send information to any other processing element, both PE3 and PE1 may send predicted output data instead of processing currently received input data. Stated generally, when the stream manager 134 determines that a particular input into a downstream processing element does not significantly affect the output of that processing element, it may instruct all upstream processing elements that contribute to that insignificant input to send predicted output data. However, because PE2 does send information to PE4, which has an output (i.e., Input 2) that significantly impacts the output of PE5, PE2 may continue to process received input data rather than outputting predicted output data for all its outputs. PE2 may nonetheless send predicted output data on the output that is transmitted to PE3 but continue to process input data for the output that is transmitted to PE4.

Figures 7A, 7B, 7C:
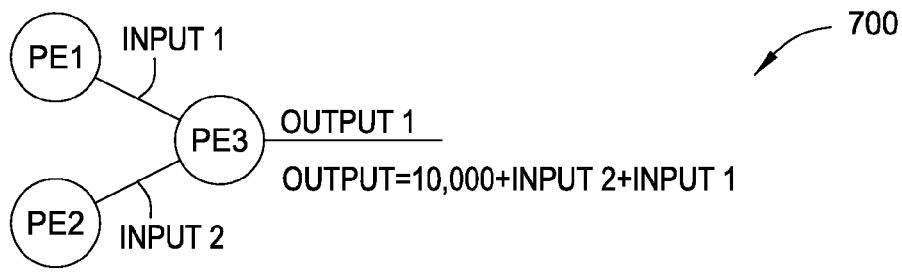
FIGS. 7A-7C illustrate deterministic processing elements that may use predicted output data, according to one embodiment of the invention.

FIGS. 7A-7C illustrate processing elements using predicted output data, according to one embodiment of the invention. Specifically, FIG. 7A shows an operator graph 700 in which a processing element—PE3—is deterministic based solely on the output, regardless of the input values. As shown, the algorithm 702 for PE3 adds a large constant to relatively small inputs. The stream manager 134 may evaluate the standard deviation of the previous values of Output 1 to determine whether the values are deterministic. Specifically, the stream manager 134 may plot each previously transmitted output value for PE3 and extrapolate a standard deviation for the plot to determine the variation of the output values. If the standard deviation is below a predefined value, the stream manager 134 may consider the outputs of PE3 as deterministic. In another embodiment, the stream manager 134 may compare the output values to a predetermined range. If a certain percentage of the output values are within the range, the stream manager 134 may mark the processing element as deterministic. If the output values are not deterministic (i.e., not enough of the output values are within the range) the predicted data module 327 may not generate predicted output data for the processing element.

Table 705 of FIG. 7B illustrates the negligible effect both Inputs 1 and 2 have on Output 1. Because Inputs 1 and 2 for previous cycles had a negligible effect on Output 1, the stream manager 134 may determine that future received inputs will also have a negligible effect on the output. Table 710 of FIG. 7C illustrates that the stream manager 134 may instruct PE3 to output predicted output data instead of processing the inputs. Specifically, the predicted output data may be the average of the outputs from Previous Cycles 1, 2, and 3. Moreover, the stream manager 134 may continue to monitor the output of PE3 to ensure it remains within a predefined range or that the standard deviation has not increased beyond tolerable limits. If either indicator is no longer true, the stream manager 134 may not consider the output of PE3 deterministic.

In one embodiment, the stream manager 134 may consider the output of PE3 deterministic so long as the inputs stay within a range defined by the previously received inputs. The stream manager 134 may, for example, first monitor the previous output data and ascertain that is deterministic. However, the stream manager 134 may also use the previously received input to establish a range to ensure the output remains deterministic. Using table 705, the limits of the range may be from 300, the greatest valued input, to 2, the least valued input. Alternatively, the stream manager 134 may establish a separate range for each of the inputs. As long as the current inputs fall within that range, PE3 may forgo processing the inputs and instead transmit the predicted output data. In this manner, the stream manager 134 may provide a higher confidence that the predicted output data is accurate. For example, if the current input for Input 1 is 400 and the current input for Input 2 is 30, because Input 1 falls outside of the range defined by the previously received input data, the stream manager 134 may characterize the output of PE3 as non-deterministic.

Although not shown, in one embodiment, the stream manager 134 may instruct one or more processing elements upstream from PE3 to stop processing current input data and instead transmit predicted output data. Like the example shown in FIG. 6D, PE3 may not need the processed outputs of PE1 and PE2 in order to provide a predictable output. Accordingly, both PE1 and PE2 (or only one) may send predicted output data to PE3. Moreover, PE3 may either process the predicted output data received from PE1 or PE2, or transmit predicted output data based on, for example, the average of Output 1 from Previous Cycle 1, 2, and 3.

Although FIGS. 5-7 use numbers to represent input and output data, the invention is not limited to such. For example, the same techniques may be applied to natural language, XML, programming instructions and the like. Furthermore, the stream manager 134 may determine that a processing element is deterministic based on only one previous cycle rather than multiple cycles. Similarly, the predicted data module 327 may determine predicted output data for a processing element based on only a subset of the previous cycles.

Returning to FIG. 4, if at step 415 the stream manager 134 determines that a processing element is deterministic based on, for example, the techniques discussed in FIG. 5-7, at step 420 the stream manager 134 instructs the processing element to transmit predicted output data in lieu of processing the currently received input data. For example, the predicted output data may be the most frequently transmitted output value, or the mean for all or only a portion of the output values (e.g., only the output values within the acceptable range). Further, the stream manager 134 may instruct a processing element to transmit predicted output data only at a predetermined ratio or during certain intervals.

Moreover, the stream manager 134 may add a tag to the predicted output data transmitted by a processing element that includes a score which represents the confidence level or accuracy of the predicted output data. For example, if the previously transmitted output values are within a range 80% of the time, the corresponding predicted data would have a lower score than predicted output data sent from a processing element that has output values that are within a range 90% of the time. Accordingly, even if the baseline accuracy necessary to transmit predicted output data is 80% accuracy, the score informs a system administrator or a recipient of the output data if the predicted output data exceeds that baseline.

Generally, a stream computing application may ascertain processing elements with outputs that are deterministic. The stream computing application may instruct the deterministic processing element to transmit predicted output data instead of processing currently received data. This predicted output data may be based on previously transmitted outputs from the processing element. Transmitting predicted output data may alleviate backpressure, reduce data propagation time, reduce costs of operating the stream computing application, reduce demand on shared hardware resources, or increase the tuple throughput rate in a stream computing application.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for processing data, comprising:
   receiving streaming data to be processed by a plurality of processing elements, the processing elements processing at least a portion of the received streaming data by operation of one or more computer processors;
   establishing an operator graph of the plurality of processing elements, the operator graph defining at least one execution path and wherein at least one of the processing elements of the operator graph is configured to receive data from at least one upstream processing element and transmit data to at least one downstream processing element;
   determining that an output of a first processing element of the plurality of processing elements is predictable based on at least one previously transmitted output value;
   receiving a current input value at a second processing element of the plurality of processing elements, wherein the second processing element is unable to meet one or more throughput requirements for the streaming data by processing the received current input value; and
   in response to receiving the current input value, and instead of processing the received current input value, transmitting a predicted output value from the second processing element, wherein the predicted output value is based on previously computed output values generated by the second processing element.

2. The method of claim 1, wherein the first and second processing elements are the same processing element.

3. The method of claim 1, wherein the one or more performance requirements include at least one of power consumption, a predicted time required to process the input value, CPU usage, tuple throughput rate, and buffer usage.

4. The method of claim 1, wherein the output is predictable based on at least one previously received input value that corresponds with the at least one previously transmitted output value.

5. The method of claim 4, further comprising:
   determining if the current input value is within a range based on the at least one previously received input value; and
   if so, transmitting the predicted output value from the second processing element, wherein the first and second processing element are the same processing element.

6. The method of claim 4, wherein the first processing element receives a plurality of corresponding inputs, wherein the output is not predictable based on at least one of the plurality of corresponding inputs that is received from the second processing element, and wherein the second processing element is upstream from the first processing element.

7. The method of claim 1, wherein determining whether the output is predictable further comprises:
   determining whether a plurality of previously transmitted output values transmitted by the first processing element are within a predetermined value of each other; and
   if so, generating the predicted output value irrespective of the received current input value.

8. The method of claim 1, further comprising, adding a score to the predicted output value that represents the accuracy of the predicted output value.

9. The method of claim 1, wherein the predicted output value is an average of a plurality of previously transmitted output values generated by the second processing element.

10. The method of claim 1, wherein the first and second processing elements are distinct processing elements.

11. The method of claim 1, further comprising determining whether the second processing element is unable to meet one or more performance requirements in response to receiving the current input value.

12. A computer-implemented method for processing data, comprising:
   receiving streaming data to be processed by a plurality of processing elements, the processing elements processing at least a portion of the received data by operation of one or more computer processors;

establishing an operator graph of the plurality of processing elements, the operator graph defining at least one execution path and wherein at least one of the processing elements of the operator graph is configured to receive data from at least one upstream processing element and transmit data to at least one downstream processing element;

determining whether an output of a first processing element of the plurality of processing elements is predictable based on at least one previously transmitted output value being within a first predefined range of at least one corresponding previously received input value;

receiving a current input value at a second processing element of the plurality of processing elements;

determining if the current input value is within a second predefined range of one of the at least one corresponding previously received input value; and in response to determining that the output of the first processing element is predictable and the current input value is within the second predefined range, transmitting the current input value as the output from the second processing element.

13. A computer-implemented method for processing data, comprising:

receiving streaming data to be processed by a plurality of processing elements, the processing elements processing at least a portion of the received streaming data by operation of one or more computer processors;

establishing an operator graph of the plurality of processing elements, the operator graph defining at least one execution path and wherein at least one of the processing elements of the operator graph is configured to receive data from at least one upstream processing element and transmit data to at least one downstream processing element;

determining that an output of a first processing element of the plurality of processing elements is predictable based on at least one previously transmitted output value;

receiving a current input value at a second processing element of the plurality of processing elements, wherein the first and second processing elements are distinct processing elements; and in response to receiving the current input value, and instead of processing the received current input value, transmitting a predicted output value from the second processing element, wherein the predicted output value is based on previously computed output values generated by the second processing element.

14. The method of claim 13, wherein the second processing element is downstream of the first processing element.

15. The method of claim 13, further comprising:

determining whether the second processing element is unable to meet one or more performance requirements by processing the received current input value, wherein the predicted output value is transmitted if the second processing element is unable to meet the one or more performance requirements.

16. The method of claim 15, wherein the one or more performance requirements include at least one of power consumption, a predicted time required to process the input value, CPU usage, tuple throughput rate, and buffer usage.

17. The method of claim 13, wherein the output is predictable based on at least one previously received input value that corresponds with the at least one previously transmitted output value.

18. The method of claim 13, further comprising adding a score to the predicted output value that represents the accuracy of the predicted output value.

* * * * *